April 26, 1932. J. M. CUNNINGHAM 1,855,282
GARDEN IMPLEMENT
Filed Jan. 23, 1930
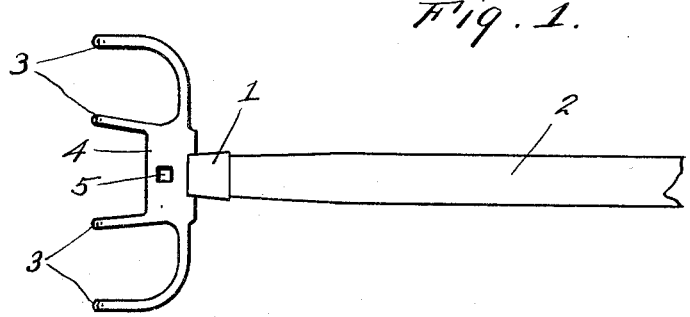
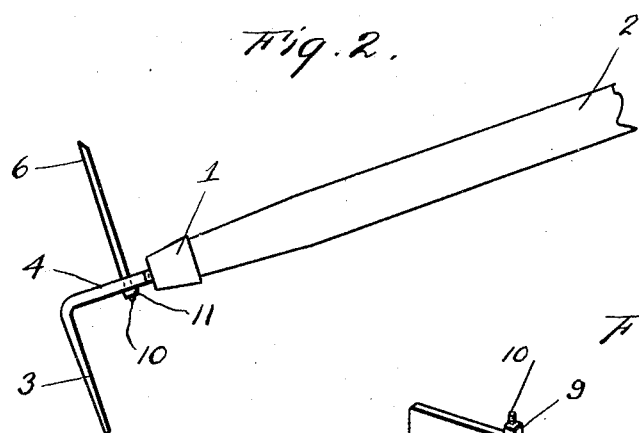
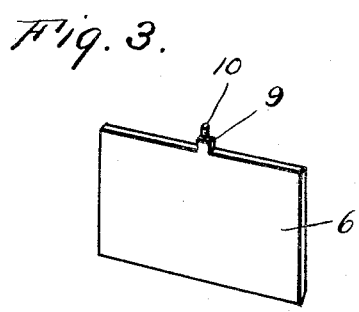
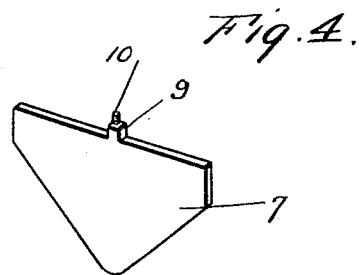
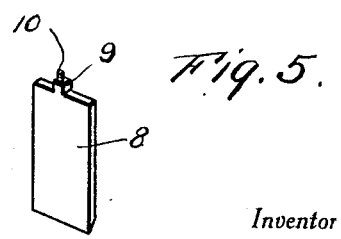
Inventor
James M. Cunningham
By Clarence A. O'Brien
Attorney Patented Apr. 26, 1932

1,855,282

UNITED STATES PATENT OFFICE

JAMES M. CUNNINGHAM, OF GLENVILLE, NORTH CAROLINA

GARDEN IMPLEMENT

Application filed January 23, 1930. Serial No. 422,837.

The present invention relates to garden tools and aims to provide a means for selectively mounting a plurality of tool blades upon a potato digger.

In the drawings:

Figure 1 is a top plan view of a potato digger,

Figure 2 is a side elevation thereof with a hoe attached thereto,

Figure 3 is a perspective view of the hoe,

Figure 4 is a perspective view of a pointed hoe, and

Figure 5 is a perspective view of a mattock.

Referring to the drawings in detail it will be seen that numeral 2 denotes a handle with a socket 1 on one end thereof on which socket are formed tines 3 between the center ones of which is formed a web 4. In this web 4 there is formed a square hole 5. A number of tool blades may be provided such as the hoe 6, pointed hoe 7 for laying out rows, and the mattock 8, each of which has a squared shank 9 adapted to fit into the squared hole 5 and be secured therein by means of a nut 11 threaded on a reduced threaded extension 10 which projects from the squared shank 9.

The present embodiment of the invention has been described in considerable detail merely for the purposes of exemplification and it is to be understood that changes in the details of construction may be resorted to without departing from the spirit or scope of the invention as hereinafter claimed.

Having thus described my invention, what I claim as new is:

A garden tool of the type described, comprising a handle, a socket on the handle, a flat substantially rectangular plate secured by one longitudinal edge in said socket, laterally projecting downwardly bent longitudinally aligned tines on its other longitudinal edge, and another similar tine protruding from and at an angle to each end edge thereof, said tines being integral with the plate, the flat portion of said plate being provided with means for detachably securing thereto various forms of implements.

In testimony whereof I affix my signature.

JAMES M. CUNNINGHAM.